2,772,996

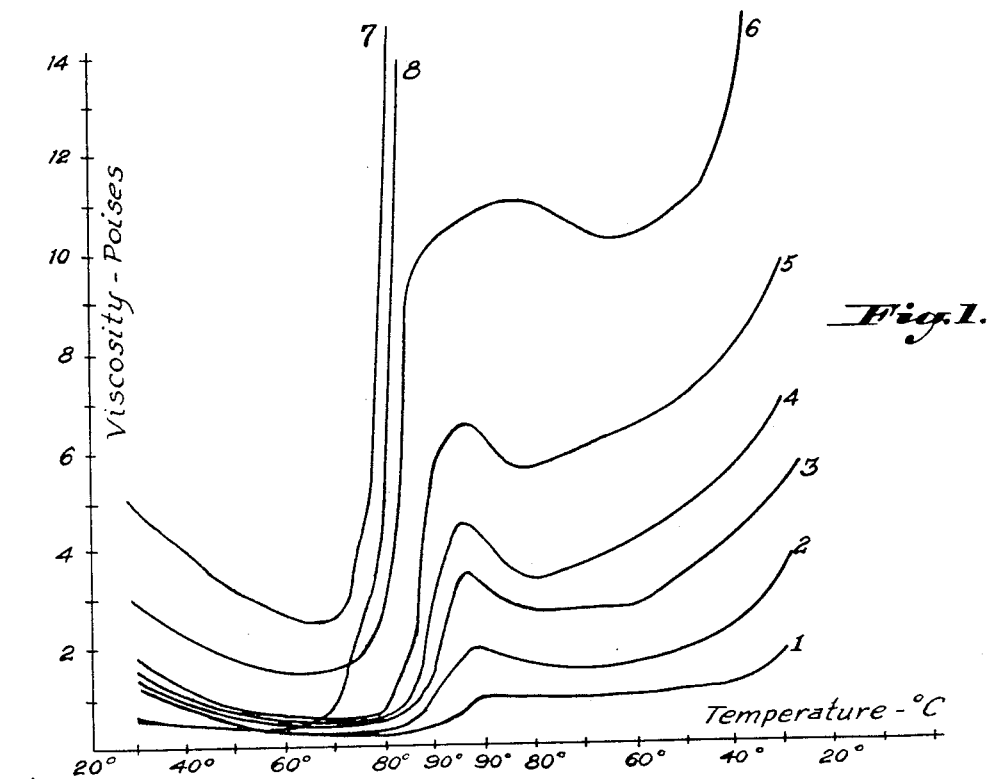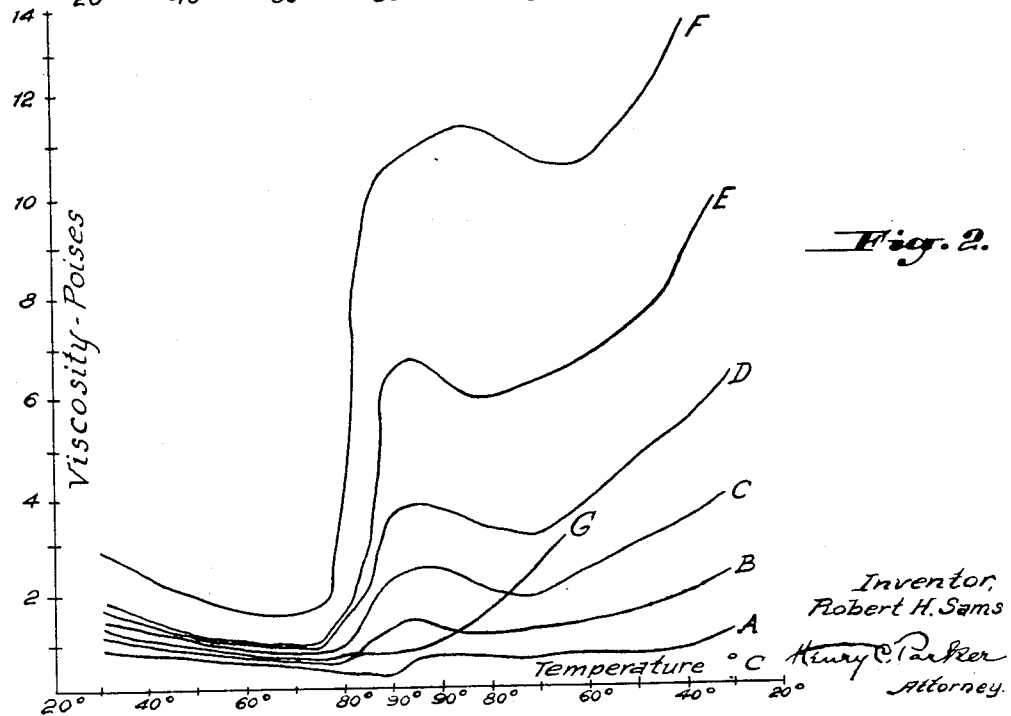

BORATED-SILICATE-STARCH LAMINATING ADHESIVES AND MANUFACTURE OF COMBINED FIBERBOARD THEREWITH

Robert H. Sams, Darby, Pa., assignor to Philadelphia Quartz Company, Philadelphia, Pa., a corporation of Pennsylvania Application October 15, 1953, Serial No. 386,230

17 Claims. (Cl. 154—138)

This invention relates to borated-silicate-starch laminating adhesives and manufacture of combined fiber board therewith; and it comprises a novel adhesive containing from about 1.5 to 10 percent by weight of a raw unswollen starch-like material, having the property of swelling by hydration before going into solution when heated in water to temperatures within the range of from about 55° to 80° C., usually from about 1 to 25 percent of a finely-divided siliceous material, such as clay, and from about 0.2 to 5 percent by weight of an alkali metal borate or from about 15 to 150 percent borate based on the starch content of the adhesive, all dispersed in an aqueous solution of sodium silicate constituting at least about 50 percent of the adhesive as a whole; the said silicate solution having a viscosity within the range of from about 0.25 to 15 poises and a gravity of from about 30 to 50° Bé. at 20° C., and a percent ratio of $Na_2O$ to $SiO_2$ within the range of from about 1:2 to 1:4.2; said adhesive having an overall viscosity at operating temperatures of from about 0.2 to 15 poises and a filter test at operating temperatures of from about 2 to 20 cc. and, in the case of a composition free from clay, up to about 30 cc.; said adhesive having a Viscograph curve with a knee at a viscosity of from about 0.2 to 3 poises which lies between about 70° and 85° C. and, in the case of a composition free from clay, between 60° and 75° C.; said adhesive having the characteristic property of increasing in viscosity at a rate substantially higher than that of a similar adhesive free from said alkali metal borate when heated to temperatures within the range of from about 55° to 90° C. My invention also includes a process of using the described adhesive in the making of combined fiber board on one of the conventional high-speed laminating machines wherein the adhesive is applied to the face of one ply and at least one additional ply is combined therewith, the applied adhesive being immediately heated to temperatures causing swelling of its starch-like material, whereby a flash bond is produced; all as more fully hereinafter set forth and as claimed.

In the copending application of Robert L. Kreyling, Serial No. 169,537, filed June 21, 1950, now Patent No. 2,669,282, a starch-clay-silicate adhesive is described which has found large scale commercial use in the production of corrugated paper board. This adhesive has been generally recognized as providing the fastest set and forming the best bonds of any of the silicate adhesives previously used in the laminating art. Plants producing box board, however, are continuously looking for adhesives having faster sets and producing better bonds so that they can run their combining machines faster and produce more box board per minute.

While making an extensive series of tests in the attempt to find ways of improving the Kreyling adhesive I made the surprising discovery that the addition of a small amount of borax to a typical starch-clay-silicate adhesive of the Kreyling type is capable of increasing the viscosity, within the critical combining temperature range, by a factor which is usually several hundred percent. This discovery, made with a standard Viscograph, a product of the Brabender Corp., in which the adhesive is heated gradually up to a maximum temperature of about 95° C. followed by cooling, while a record of the viscosity is being made, would indicate that a much quicker set or "grab" would be produced by the borated composition on a combining machine. Subsequent extensive tests made on commercial combining machines have fully confirmed the conclusions reached as a result of these Viscograph tests.

It may seem strange that this viscosity-increasing effect of borax on starch-silicate adhesives had not been discovered and reported previously, especially since borax has been added to both starch adhesives and to silicate adhesives individually, at least in small proportions. It appears that I am the first to have added borax to an adhesive containing both starch and silicate in such proportions as to produce a substantial viscosity increase upon heating of the adhesive.

My tests have shown that the described viscosity-increasing effect occurs over a borate concentration in the starch-silicate adhesives ranging from about 0.2 to 5 percent by weight, based on the weight of the adhesive, or from about 15 to 150 percent by weight, based on the weight of the starch in the adhesive. The effect of even 0.2 percent of borax is clearly evident in Viscograph tests but in practical combining operations the effect produced by this addition seems to be so small that it cannot readily be detected. When the borate content is increased to 0.5 percent, however, the effect produced is clearly apparent even in commercial operations; hence it is preferred to include at least about 0.5 percent of a borate in the new adhesive. The upper limit of 150 percent based on the weight of the starch content is caused because the borax seems to make the starch lumpy when its content reaches this upper limit. It is possible that, if some way of eliminating this lump formation could be discovered, even higher concentrations of borax could be employed. But since the use of such concentrations would not be as economical, this is more of academic than practical interest.

I have found that the viscosity-increasing effect is produced by all of the normal alkali metal borates, for example sodium and potassium meta and tetra borates. Perborates cause difficulties from frothing as the adhesive is heated and apparently react with the starch content; hence the use of perborates is not recommended. There is little difference between the effects produced with sodium metaborate and sodium tetraborate. Boric acid is an equivalent and, since it forms a sodium borate as soon as it comes in contact with the sodium silicate present in the adhesive, the addition of boric acid to the adhesive can be considered as being included within the scope of the term "alkali metal borate" as used in the following description and in the claims.

In the case of starch-clay-silicate adhesives the presence of clay or an equivalent has been found to be necessary. This material increases the filter tests and has the functions of imparting thixotropic properties to the adhesives and preventing undue penetration of the adhesives into the boards to be laminated before setting of the adhesives. A minimum clay content of about 4 percent in starch-clay-silicate adhesives is considered essential. I have now made the surprising discovery that, if a small amount of borax is included in the adhesive compositions the rate of setting is actually increased to such an extent that the presence of clay to prevent penetration becomes of much less importance and with some formulations it is possible to dispense with the clay entirely. The explanation apparently resides in the fact that in the conventional laminating machines the adhesive is heated to setting temperatures so rapidly and the borated adhesives set so rapidly that these adhesives set before they have time to penetrate unduly. I usually prefer to include clay in the new adhesives, however, since it is the least expensive component and since it contributes to the value of the adhesives, increasing their adaptibility and their operating life.

In the case of clay-silicate adhesives and starch-clay-silicate adhesives the so-called filter test can be used to determine whether an adhesive will penetrate unduly and whether it has satisfactory thixotropic characteristics. This filter test is described in Patent No. 2,239,358. For these prior adhesives a filter test of from about 3 to 15 cc. is essential for high speed laminating operations. But owing to the viscosity increasing effect of the borate addition, described above, the filter test in the case of the present adhesives has lost most of its significance. In the case of my borated adhesives containing say from 1 to 2% of clay, the filter test may be as high as 20 cc. and in the case of clay-free adhesives the filter test may range up to 30 cc. Fortunately I have been able to devise another convenient test for the operativeness of my borated adhesives which is even more significant than the filter test for the clay-silicate and starch-clay-silicate adhesives. This is the standard Viscograph test.

The Viscograph test is described in U. S. Patent No. 2,554,035 and consists in recording the viscosity changes of the test adhesive while it is being heated without evaporation of moisture at a rate of about 1.5° C. per minute up to a temperature of 95° C. followed by cooling at a slightly more rapid rate. The viscosity is then plotted against the temperature, as shown in the accompanying drawing. In this showing, Fig. 1 shows a series of Viscograph curves in which the viscosities are plotted as ordinates against the temperatures as abscissas, demonstrating the effect of borax on the shapes and positions of the curves, while Fig. 2 shows a similar set of curves designed primarily to show the effect of varying starch content on the shapes and positions of the curves.

In making the Viscograph curves shown in the two figures of the drawing, the following compositions were employed, the numerals and letters designating the compositions corresponding to the numbers and letters on the curves of the drawing.

*Curve 1.*—5.5 parts of starch dispersed in 7.0 parts of water, to which 79.0 parts of "N" silicate were then added (no clay; no borax).

*Curve 2.*—5.5 parts of starch dispersed in 7.0 parts of water, to which was added 79 parts of "N" silicate, followed by 8.5 parts of Barden clay (no borax).

*Curve 3.*—0.2 part of borax dissolved in 6.8 parts of water, 5.5 parts starch dispersed in the solution, 79 parts of "N" silicate mixed in and then 8.5 parts of Barden clay.

*Curve 4.*—0.5 part of borax dissolved or disposed in 6.5 parts water, 5.5 parts starch dispersed in the solution, 79 parts of "N" silicate mixed in and then 8.5 parts Barden clay.

*Curve 5.*—1 part of borax dispersed in 6 parts water, 5.5 parts starch dispersed in the mixture, 79 parts of "N" silicate mixed in and then 8.5 parts Barden clay.

*Curve 6.*—2 parts of borax dispersed in 5 parts water, 5.5 parts starch dispersed in the mixture, 79 parts "N" silicate mixed in and then 8.5 parts Barden clay.

*Curve 7.*—3 parts of borax dispersed in 4 parts water, 5.5 parts starch dispersed in the mixture, 79 parts "N" silicate mixed in and then 8.5 parts Barden clay.

*Curve 8.*—5.5 parts of starch dispersed in 6 parts water, 1 part borax added and then 79 parts of "N" silicate mixed in (no clay).

*Curve A (Fig. 2).*—1 part borax dissolved or dispersed in 8.5 parts water, 82 parts "N" silicate mixed in and then 8.2 parts Barden clay (no starch).

*Curve B.*—1 part of borax dispersed in 7.5 parts water, 2.5 parts starch dispersed in the mixture, 80.5 parts of "N" silicate mixed in and then 8.5 parts Barden clay.

*Curve C.*—1 part of borax dispersed in 7 parts of water, 3.5 parts starch dispersed in the mixture, 80 parts "N" silicate mixed in and then 8.5 parts Barden clay.

*Curve D.*—1 part of borax dispersed in 6.5 parts of water, 4.5 parts starch dispersed in the mixture, 79.5 parts "N" silicate mixed in and then 8.5 parts Barden clay.

*Curve E.*—1 part borax dispersed in 6 parts of water, 5.5 parts starch dispersed in the mixture, 79 parts "N" silicate mixed in and then 8.5 parts Barden clay.

*Curve F.*—2 parts borax dispersed in 5 parts water, 5.5 parts starch dispersed in the mixture, 79 parts "N" silicate mixed in and then 8.5 parts Barden clay.

*Curve G.*—2 parts borax dispersed in 7 parts water, 2 parts starch dispersed in the mixture, 80.5 parts "N" silicate mixed in and then 8.5 parts Barden clay.

The "N" silicate used in these tests had a gravity of 41.0° Bé. and a weight ratio of $SiO_2$ to $Na_2O$ of 3.23. It contained 8.90% $Na_2O$ and had a viscosity of 1.8 poises at 20° C. The Barden clay was a high grade kaolinite clay from J. M. Huber Corp. The starch was #7021 pearl corn starch from Anheuser-Busch, Inc.

It will be noted from the curves of Fig. 1 that the addition of borax to a starch-clay-silicate adhesive has the effect of moving the viscosity minimum of the Viscograph curves in the direction of lower temperatures and higher minimum viscosities. Thus while a standard starch-clay-silicate adhesive (curve 2) produces a Viscograph curve having a knee at about 87° C. and a viscosity of 0.7 poise, the knee of curve 7 for a similar adhesive containing 3% borax lies at about 68° C. and 2.7 poises. The most striking effects produced by the borax addition, however, are the greatly accelerated increase in viscosity per degree rise in temperature following the knees of the curves and the increase in the maximum viscosity reached during the test. In curve 2, for example the viscosity rises gradually starting at about 87° and the maximum viscosity reached is only about 2 poises during the heating cycle. In contrast, curve 7, for a composition containing 3% borax, shows an almost vertical rise in viscosity to a value which evidently lies far off the chart. Curve 3, as compared with curve 2 shows that the addition of only 0.2% borax produces a pronounced increase in the maximum reached during the heating cycle and in the rapidity of the rise towards this maximum. A comparison between curves 1 and 2 shows the effect of the addition of 8.5% clay upon a starch-silicate adhesive, while a comparison between curves 8 and 5 shows the effect of the addition of 8.5% clay upon an adhesive of similar composition but containing 1% borax.

The curves in Fig. 1 also show that the effect of borax additions to starch-silicate adhesives, in changing the positions of the knees of the Viscograph curves and increasing the rate of increase in viscosity, is considerably reduced or masked when clay is present in the compositions. Thus, while the addition of 1% borax to the clay-free composition of curve 1 causes the knee of the curve to drop from about 92° to 65° (see curve 8), in the case of similar compositions containing 8.5% clay (curves 2 and 5) the corresponding drop is from about 88° to 80°, caused by the addition of 1% borax. Considered from this single standpoint the presence of clay in the compositions may be disadvantageous. The advantages gained by the presence of clay in my adhesives, however, usually outweigh this one disadvantage.

As a result of making the curves shown in Figs. 1 and 2 of the drawing and a large number of additional curves, as well as making many practical corrugating tests on the present adhesives, I have been able to correlate the compositions and the properties which are essential in borax-starch-silicate adhesives to make them suitable for high-speed corrugating operations. Thus these adhesives should contain from about 1.5 to 10% of a raw unswollen starch-like material having the property of swelling by hydration before going into solution when heated in water to temperatures within the range of from about 55° to 80° C., from about 0.2 to 5% of an alkali metal borate or from about 15 to 150% based on the starch content of the adhesive, all dispersed in an aqueous solution of sodium silicate constituting at least about 50% of the adhesive as a whole; said silicate solution having a viscosity within the range of from about 0.25 to 15 poises and a gravity of from about 30 to 50° Bé. at 20° C., and a percent by weight ratio of $Na_2O$ to $SiO_2$ within the range of from about 1:2 to 1:4.2; said adhesive also advantageously containing dispersed therein from about 1 to 25% of a finely-divided siliceous material having an average particle size not substantially exceeding about 2 microns, such as clay, having an overall viscosity at operating temperatures within the range of from about 0.2 to 15 poises, a filter test at operating temperatures of from about 2 to 20 cc. and, in the case of clay-free compositions, up to 30 cc. or over; said adhesives producing Viscograph curves with knees at viscosities of from about 0.2 to 3 poises which lie between about 70° and 85° C. and, in the case of clay-free compositions, between 60° and 75° C. The described compositions all have the characteristic property of increasing in viscosity at a rate substantially higher than that of similar adhesives free from said alkali metal borate when heated to temperatures within the range of from about 55° to 90° C.

I usually prefer to use a clay as the finely-divided solid siliceous component of my adhesives but any other siliceous materials can be used provided that they are of colloidal fineness. This means that from about 92 to 99% of the material should pass a 325 mesh screen. At least 50% should have a particle size of 2 microns or less. Diatomaceous earth, fuller's earth, ball clay, china clay and calcined kaolinites are particularly suitable. Equally suitable are the reactive siliceous synthetic products for example the amorphous precipitated silicas, such as "Santocel" and "Hysil" and acid treated kaolinites, such as "Zeolex 20." It requires at least about 1% of siliceous material to produce an appreciable effect on the properties of the adhesive. The effect produced depends upon the particle size of the siliceous material. For example it requires approximately 12% of china or ball clay to produce the effect produced by only 1.5% of Wyoming bentonite or by 6% of a South Carolina kaolin or by 5% of diatomaceous earth. No more should be used than is required to produce a viscosity of from about 0.5 to 5 poises at operating temperatures for the manufacture of corrugated paper board or from about 5 to 15 poises at operating temperatures for the manufacture of solid fiber board. The use of borax, as in the present adhesives, permits a substantial reduction in the quantity of clay required in the adhesives or the complete elimination of this component.

More important, the use of borax in my adhesive enables a substantial reduction in the starch content of the adhesive, as compared with adhesives free from borax. Thus a silicate adhesive containing 3% starch and 1% borax and 8.5% clay has a Viscograph curve which rises in viscosity during the heating cycle to a maximum of about 2 poises, as also does a similar adhesive containing 5.5% starch and 8.5% clay. One percent borax is thus equivalent to about 2½% starch in producing the same maximum viscosity. But the borax-containing adhesive is better for high speed laminating for the reason that the knee of its Viscograph curves lies at least 7° lower. This shows that setting of the borated adhesive takes place at a lower temperature and hence more rapidly when passed through a laminating machine. Since starch is the most expensive component of these adhesives, a substantial saving is effected in the use of borax with a consequent reduction in the starch content.

More important, the borated adhesives produce a better bond, one that is more uniform and one that is substantially free from non-bonded spots. Apparently the latter effect is due to the fact that the borax increases the swelling of the starch during the bonding operation and this tends to bridge any gaps between the plies as the latter are being united. There is also a greatly reduced tendency for the finished board to warp when borated adhesives are employed, this being due probably to the more uniform bond produced. There is less dusting of the adhesive during printing of the finished board. And viscosity control of the adhesive during the combining operation is less critical. This makes the adhesive more versatile. It is also true that less adhesive per running foot of board is required to produce bonding, this being due, presumably, to greater swelling of the adhesive during the laminating operation.

As in the case of the Kreyling adhesive, my new adhesive has a life at ordinary temperatures which is substantially indefinite. The borax acts to some extent as an antiseptic and this, together with the high pH of my adhesives, effectively eliminates any tendency for the starch content to decompose. It is important that the adhesives contain no more than about 2 percent protein and hence the starch material employed should contain no more than from about 5 to 7% of protein.

All types of starch can be used in my adhesives. Potato starch and amioca starches give Viscograph curves of slightly different shape than those produced with pearl corn starch but the adhesives are equally effective. Other suitable starches are rice starch, sago, tapioca and cassava starches, arrowroot, arum, the so-called moss starch, inulin and glycogen. All other starch-like materials, having the property of swelling before going into solution when heated with water to temperatures within the range of from about 55° to 80° C. are operative. These substances include starch derivatives, such as methyl cellulose, starch esters, sodium palconate, the sodium salt of palconic acid, an alkali-soluble material extracted from redwood bark with sodium hydroxide which has been shown to consist mainly of a partially methylated phenolic acid, containing aliphatic hydroxyls, phenolic hydroxyls, and carboxyl groups in the ratio of 2:4:3; see an article by Frank A. Kottwitz and L. D. Forman in Ind. Eng. Chem., 40, 243 (1949); supplied by The Pacific Lumber Company and described in their Technical Bulletin No. T-4 (1950); "Silvacon," a complex mixture of the salts of lignin and tannic acids derived from spruce wood, supplied by Weyerhaeuser Timber Company, more fully described in Western Pulp & Paper, vol. 1, #4, pages 12–14 (1948); "Solkafil," a cellulose pulp preparation made from wood fibers, described in "The Handbook of Material Trade Names," Zimmerman and Lavine, 1946, published by Industrial Research Service, Dover, N. H., supplied by the Brown Company, and "Solkafloc" which is fully described on pages 131 and 132 of the "Chemical Materials Catalog" (1949–1950), supplied by the Brown Company. The term "starch-like material" as used in the following claims is intended to include these materials.

The silicate solution used as the liquid or aqueous phase of my adhesive may, as indicated previously, have a percent ratio of $Na_2O$ to $SiO_2$ within the range of from about 1 to 2 to 1 to 4.2 and a viscosity of from about 0.25 to 15 poises at 20° C. The permissible range of gravities of the silicate solution ranges from about 30° to 50° Bé. at 20° C., the higher gravities being employed with the more alkaline silicates. For adhesives which are to be applied hot, i. e. which are heated before application, the liquid phase gravity should lie between about 32 and 50° Bé., while for adhesives which are to be applied at room temperatures the range is from about 30 to 48° Bé. Commercial silicate solutions can be employed, usually with the addition of small amounts of water, or solid silicates can be dissolved in the proper quantities of water required to produce the required gravities. Owing to the fact that the more alkaline silicates of a given concentration have the lower viscosities it is possible to employ more clay and/or more starch with the former.

My invention can be explained in greater detail by reference to the following specific examples which represent practical operating embodiments thereof.

The adhesive compositions designated previously as 3 to 8 and B to G, corresponding to the similarly designated curves in the drawing, constitute specific operating embodiments of this invention. The following compositions represent additional specific examples of my adhesives:

*Example 1*

A series of adhesives was prepared and Viscograph tests were run on each. These adhesives had the following compositions:

1. 79% "N" silicate, 6% water, 5.5% potato starch, 8.5% clay and 1% borax.
2. 79% "N" silicate, 6% water, 5.5% potato starch, 8.5% clay, 0.5% borax and 0.5% isopropanol.
3. 79% "N" silicate, 6.0% water, 5.5% corn starch, 8.5% clay, 0.5% borax and 0.5% isopropanol.
4. 79% "N" silicate, 6% water, 5.5% corn starch, 8.5% clay and 1.1% sodium metaborate·8H2O.
5. 79% "N" silicate, 6% water, 3.7% starch, 8.5% clay, 1% borax and 1.8 soy flour.
6. 79 parts "N" silicate, 6.0 parts water, 5.5 parts starch, and 1 part borax (no clay).

The above adhesives were run in the standard Viscograph test. The viscosities recorded during the test are indicated in the following table for the temperatures indicated.

| Adhesive | Initial Viscosity, 30° C., poises | Minimum Viscosity, Poises at °C. | Viscosity, 10 minutes after min. at °C. | Viscosity, Maximum at °C. |
|---|---|---|---|---|
| #1 | 1.9 | 1.0, 63° | 3.8, 83° | 5.2, 95° |
| #2 | 2.2 | 1.2, 62° | 2.8, 82° | 4.8, 95° |
| #3 | 2.0 | 1.1, 73° | 4.2, 83° | 6.6, 95° |
| #4 | 1.8 | 0.8, 76° | 1.9, 86° | 5.3, 95° |
| #5 | 2.6 | 1.3, 73° | 1.7, 82° | 3.7, 95° |
| #6 | 1.25 | 0.6, 73° | 1.2, 83° | thick, 93° |

*Example 2*

10 parts by weight of Anheuser-Busch #7021 pearl corn starch were wet with 10 parts of water, 74 parts of "N" silicate were added with stirring, then a slurry of 3 parts of borax in 3 parts of water were added with more stirring. The resulting adhesive contained 10% starch, 13% water, 3% borax and 74% of "N" silicate (no clay). In a Viscograph test the following values of temperature and corresponding viscosity were obtained:

| °C.: | Poises |
|---|---|
| 30 | 1.35 |
| 44 | 1.00 |
| 59 | 0.89 |
| 62 | 0.95 |
| 65 | 1.08 |
| 68 | 1.30 |
| 70 | 1.62 |
| 72 | 2.57 |
| 74 | 5.26 |
| 75 | 8.27 |
| 76 | 12.49 |
| 77 | Thick |

*Example 3*

5 parts of #7021 starch were wet with 5 parts of water, 50 parts of "S-35" silicate were added with stirring, followed by a slurry of 1 part borax in 1 part of water, and then 20 parts of Barden clay and 18 parts of water added alternately in half-portions with further agitation. The "S-35" silicate had a ratio of 1Na2O:3.75 SiO2 and a gravity of 35° Bé. The resulting adhesive had a composition of 5% starch, 24% water, 1% borax, 50% "S-35" and 20% clay. The following data were obtained in a Viscograph test:

| °C.: | Poises |
|---|---|
| 30 | 0.92 |
| 44 | 0.94 |
| 58 | 1.00 |
| 65 | 1.16 |
| 70 | 1.51 |
| 72 | 2.25 |
| 73 | 4.00 |
| 74 | 7.16 |
| 75 | 10.33 |
| 76 | 13.19 |
| 77 | Thick |

*Example 4*

5.5 parts #7021 starch were wet with 6 parts water. A syrup containing 0.5 borax dispersed in 0.5 part diethylene glycol was added with stirring. One hour later 79 parts of "N" silicate were added with stirring and finally 8.5 parts Barden clay were mixed in. The resulting adhesive contained 5.5% starch, 6% water, 0.5% borax, 0.5% diethylene glycol, 79% "N" silicate and 8.5% clay. A Viscograph test provided the following data:

| °C.: | Poises |
|---|---|
| 30 | 2.11 |
| 44 | 1.47 |
| 58 | 1.19 |
| 73 | 1.01 |
| 78 | 0.98 |
| 81 | 1.01 |
| 83 | 1.24 |
| 85 | 1.59 |
| 88 | 2.41 |
| 91 | 4.00 |
| 95 | 5.15 |

*Example 5*

5.5 parts of #7021 corn starch were mixed with 5 parts water, a sludge containing 1 part of boric acid crystals in 1 part water was added with stirring. 79 parts of "N" silicate were mixed in and the batch was worked several hours until a lump-free blend was obtained. 8.5 parts of Barden clay were then stirred in. The resulting adhesive contained 5.5% starch, 6.0% water, 1% boric acid, 79% of "N" silicate and 8.5% clay. A Viscograph test gave the following data:

| °C.: | Poises |
|---|---|
| 30 | 3.90 |
| 44 | 2.63 |
| 58 | 2.12 |
| 68 | 1.92 |
| 73 | 1.92 |
| 77 | 2.19 |
| 80 | 2.84 |
| 82 | 4.42 |
| 84 | 7.01 |
| 86 | 10.42 |
| 88 | 12.78 |
| 90 | 13.73 |
| 92 | 14.18 |
| 95 | 14.92 |

*Example 6*

In this example the flow characteristics of two adhesives were compared, one being a borated clay-starch-silicate adhesive containing 80% "N" silicate, 7% water, 3.5% starch, 1% borax and 8.5% clay, while the other was a clay-starch-silicate adhesive containing 79% "N" silicate, 7% water, 5.5% starch and 8.5% clay. In this test the spindle of a Brookfield Viscometer was operated so the rotational resistance it encountered from the liquid could be measured at 4 different speeds. The stress measurements were translated to apparent viscosities and these were plotted against calculated rates-of-flow. In both cases curves were obtained whose apparent viscosity decreased with increasing rate-of-flow. The borated adhesive had a slightly lower apparent viscosity throughout the range of rates-of-flow, which means that it could be pumped more easily at operating temperatures. The borated adhesive was also appreciably cheaper owing to its lower starch content. Viscograph tests showed that the borated adhesive started to set at a lower temperature and it increased in viscosity more rapidly at bonding temperatures. In other words, the borated adhesive is superior in all characteristics required of a high-speed laminating adhesive.

*Example 7*

A plant test was run with a borated adhesive made by mixing 292 pounds of water, 40 pounds of borax, 150 pounds of pearl corn starch, 350 pounds of Suprex clay (J. M. Huber Corp.) and 3268 pounds of "N" silicate. This gave an adhesive containing 7.1% water, 1% borax, 3.7% starch, 8.5% clay and 79.7% "N" silicate. This adhesive was run for 2 weeks on a commercial corrugating machine, the adhesive being heated to 150–152° F. It was found that the average hourly production rate could be maintained at 72,000 to 80,000 square feet per hour, whereas with a standard clay-starch-silicate adhesive production had not exceeded 68,00 to 70,000 square feet per hour.

*Example 8*

Another plant test was run with an adhesive prepared by adding 40 pounds of borax to a mixture of 300 pounds of water, 200 pounds of starch, 300 pounds of clay and 3170 pounds of 40° Bé. "N" silicate. This produced a mixture containing about 1% of borax or 20% based on the starch content. The plant had been running successfully using a starch-clay-silicate adhesive but, when the new adhesive was substituted for this, immediate improvement in the bond on both the single face and double backer sides was noted. At 225 feet per minute and with 31 feet of hot plates in the double backer section, the bond set so rapidly right out ot the edge of the board that the glue pattern could not be tested at the end of the machine.

*Example 9*

In this plant test an adhesive containing 1% borax, 7.5% water, 7.5% Barden clay, 3.7% starch and 80.3% "N" silicate was directly compared with a borax-free adhesive containing 5.3% starch, 7.5% clay and 80.3% "N" silicate. When the new adhesive was used on the double backer side only it was found to be tackier but to set slightly slower than the adhesive containing 5.3% starch. But an execellent bond was obtained on double wall board at 280 feet per minute and with 47 pound liners at 300 feet per minute. In a two weeks run it was determined that this adhesive was at least as good as that containing the higher starch content. It gave less trouble from loose edges with wet liner, and less dusting was observed. The boxes made with this adhesive had the highest compression strength ever obtained in that mill. From top to bottom the compression was 120% and from end to end 114%.

A sample of this adhesive was tested on the Viscograph in the laboratory. It had an initial viscosity of 1.4 poises at 30° C. The minimum viscosity was reached at about 76° C. and 0.9 poise, while the maximum viscosity at 95° C. was 3 poises. After cooling the viscosity was 3.7 poises.

The C-flute board made with this adhesive weighed about 134 pounds per 100 square feet and had a caliper between 0.159 and 0.163. The flat crush resistance averaged 29 pounds per square inch and adhesive bond strengths averaged 46 pounds per foot length of flute tip on the single facer side and 53 pounds per foot on the double backer side. The effective tear coverage for both was 100%. For visual rating the single face side was rated "good" while the double backer side was rated "perfect"—a very unusual achievement.

*Example 10*

Another test was run in a plant of a company which had been bonding its corrugated board at 420 F. P. M. using a standard adhesive containing 5.5% starch, 8.5% clay, 79% of "N" silicate and 7% water. Comparative tests were run with two borated adhesives the first of which contained 1.1% borax, 5.3% starch, 8.5% clay, 78.1% "N" silicate and 7% water, and the second 1.1% borax, only 3.2% starch, 8.5% clay, 80.2% "N" silicate and 7% water. Both of these borated compositions produced compositions produced an obvious improvement of the bond and the tests were considered highly successful by the operators.

*Example 11*

In another plant, which had been using an adhesive containing 5.3% starch, 7.3% water, 8.5% clay and 79% "N" silicate, a test was made with a borated adhesive containing 1% borax, 5% corn starch, 7.3 water, 7.5% clay and 79.2% "N" silicate. The plant personnel immediately noted that a better bond was being produced.

*Example 12*

In another plant test the standard starch-clay-silicate adhesive described above was replaced with an adhesive containing 79% "N" silicate, 8.5% clay, 3.7% pearl corn starch, 1% borax, 1.8% soy flour, and 6.0% water. Although the new adhesive had some tendency to foam, better tack and faster set were obtained and the cost of the adhesive was reduced substantially as compared with that of a straight silicate adhesive.

*Example 13*

In still another plant test a mixture was made containing 300 pounds water, 50 pounds borax, 200 pounds pearl corn starch, 300 pounds of clay and 290 gallons of "N" silicate. The composition of this adhesive corresponded to 7.1% water, 1.2% borax, 4.8% starch, 7.1% clay and 79.8% silicate. It was used at 136° F. with one section of six hot plates at 20 pounds steam pressure (gauge) and a second section of 33 plates at 110 pounds. At a speed of 425 to 450 F. P. M. in one eight hour shift 141,000 feet of board were produced. A better bond was obtained with improved flat crush resistance and no warp. A better printing surface was obtained. This test was run for 10 days and a better bond was noticeable, particularly with wet liners.

All of the borated adhesives which have been described in the foregoing are well adapted for use in the high-speed manufacture of combined fiberboard. In this process the adhesive is applied to one ply and at least one additional ply is combined therewith, the applied adhesive being immediately heated to temperatures causing the swelling of the starch-like material contained therein, whereby a flash bond is produced. While my adhesives can be used at ordinary room temperatures in laminating operations it is somewhat more advantageous to preheat them within the range of from about 40° to 80° C. before they are applied. It is also advantageous to have the plies preheated to temperatures within the range of from about 80° to 105° C. if the highest speeds are desired. When applied in this fashion the aqueous phase of the adhesive should have a viscosity of from about 1 to 8 poises and a gravity of from about 32 to 50° Bé. at 20° C. On the other hand if the adhesive is applied at room temperatures its aqueous phase should have a viscosity of from about 0.25 to 1.5 poises at 20° C. and a gravity of from about 30 to 48° Bé. at 20° C. In the production of solid fiber board the over-all viscosity of the adhesive at operating temperature is preferably from about 5 to 15 poises while in the production of corrugated paper the over-all viscosity should be from about 0.5 to 5 poises at operating temperatures. When thus used my adhesives are capable of combining board at speeds which are substantially higher than those achieved with any other adhesives with which I am familiar and which are within the same price range.

While I have described what I consider to be the best embodiments of the present invention it is evident of course that various modifications can be made in the specific procedures and proportions of components that have been mentioned without departing from the purview of this invention. Thus, while I have described adhesives containing small amounts of isopropanol and soy flour, there are several other materials which can be added to make the adhesives best fitted for particular industrial applications. Thus, humectants such as glycerine or an alginate which may serve as plasticizing and toughening agents, emulsifiers such as carboxymethylcellulose, and small amounts of reactive materials such as aluminum chloride which add water-resistance, can be added with advantage for special uses. My adhesives are particularly adapted to high-speed laminating operations in the manufacture of fiber board and the various specific proportions which have been set out previously are critical for adhesives suited to this particular use.

While I have set out rather broad operative ranges of components in the foregoing best results in high-speed laminating operations are obtained with somewhat narrower ranges. These are from about 2 to 5% of starch, from about 4 to 10% of clay, from about 0.5 to 4% alkali metal borate or from about 20 to 100% borate, based on the weight of the starch, and from about 75 to 80% silicate solution in which the per cent weight ratio of $Na_2O$ to $SiO_2$ is within the range of from about 1:2.5 to 1:4; the silicate solution (aqueous phase) having a viscosity within the range of from about 0.25 to 15 poises and a gravity of from about 30° to 50° Bé. at 20° C. These preferred adhesives have an over-all viscosity at operating temperatures of from about 0.5 to 15 poises and a filter test at operating temperatures of from about 3 to 15 cc.

My new adhesives can be used in many other applications wherein quick-setting strong bonds are required to be produced at a minimum cost. In these cases various modifications can be made in the specific proportions which have been listed. Other modifications of this invention which fall within the scope of the following claims will be immediately evident to those skilled in this art.

What I claim is:

1. An adhesive composition particularly adapted for use in the high-speed manufacture of combined fiber board, which comprises from about 1.5 to 10 per cent by weight of a raw unswollen starch-like material which has the property of swelling by hydration before going into solution when heated in water to temperatures within the range of from about 55° to 80° C., from about 15 to 150 percent by weight of an alkali metal borate based on the starch like material in the adhesive, and usually from about 1 to 25 percent by weight of a finely-divided solid siliceous material having an average particle size not substantially exceeding 2 microns, all dispersed in an aqueous solution of sodium silicate which constitutes at least about 50 percent by weight of the adhesive as a whole; the said silicate solution having a viscosity within the range of from about 0.25 to 15 poises and a gravity of from about 30 to 50° Bé. at 20° C. and a percent ratio of $Na_2O$ to $SiO_2$ within the range of from about 1:2 to 1:4.2; said adhesive having an over-all viscosity at operating temperatures of from about 0.2 to 15 poises, a filter test at operating temperatures of from about 2 to 20 cc. and, in the case of compositions free from clay, up to about 30 cc. and having a Viscograph curve with a knee at a viscosity of from about 0.2 to 3 poises which lies between about 70° and 85° and, in the case of compositions free from clay, between about 60° and 75° C.; said adhesive having the characteristic property of increasing in viscosity at a rate substantially higher than that of a similar adhesive free from said alkali metal borate when heated to temperatures within the range of from about 55° to 90° C.

2. The adhesive of claim 1 wherein said starch-like material is raw cornstarch.

3. The adhesive of claim 1 wherein said starch-like material is raw potato starch.

4. The adhesive of claim 1 wherein said solid siliceous material is a kaolinitic clay.

5. The adhesive of claim 1 wherein the composition is free from said finely-divided solid siliceous material and has a filter test not substantially exceeding 30 cc. and a Viscograph curve whose knee lies at a viscosity of from about 0.2 to 3 poises and at a temperature of from about 60 to 75° C.

6. The adhesive of claim 1 wherein the composition contains from 1 to 25 percent of clay as a siliceous material and which has a filter test within the range of from about 2 to 20 cc. and a Viscograph curve whose knee lies at a viscosity of from about 0.2 to 3 poises and at a temperature of from about 70° to 85° C.

7. An adhesive particularly adapted for use in the high-speed manufacture of combined fiber board, which comprises from about 2 to 5 percent by weight of starch, from about 4 to 10 percent by weight of clay, from about 20 to 100% by weight of an alkali metal borate based on the weight of the starch, all dispersed in an aqueous solution of sodium silicate constituting from about 75 to 90 percent of the adhesive as a whole; said sodium silicate having a percent ratio of $Na_2$ to $SiO_2$ within the range of from about 1:2.5 to 1:4 and said solution having a viscosity within the range of from about 0.25 to 15 poises and a gravity of from about 30° to 50° Bé. at 20° C.; the adhesive having an over-all viscosity at operating temperatures of from about 0.5 to 15 poises and a filter test at operating temperatures of from about 3 to 15 cc.

8. In the manufacture of laminated paper board on high-speed laminating machines wherein at least two plies are combined with an adhesive containing a sodium silicate solution as its aqueous phase having a viscosity within the range of from about 0.25 to 15 poises and a gravity of from about 30 to 50° Bé. at 20° C. with a percent ratio of $NaO_2$ to $SiO_2$ within the range of from about 1:2 to 1:4.2 and containing substantially uniformly dispersed therein from about 1.5 to 10 percent by weight of a raw unswelled starch-like material which has the property of swelling by hydration before going into solution when heated in water to temperatures within the range of from about 55° to 80° C., from about 15 to 150 percent by weight of an alkali metal borate based on the starch-like material in the adhesive, and usually from about 1 to 25 percent by weight of a finely-divided solid siliceous material having an average particle size not substantially exceeding 2 microns; the said silicate solution constituting at least about 50 percent of the adhesive as a whole; the said adhesive having an over-all viscosity at operating temperatures of from about 0.2 to 15 poises, a filter test at operating temperatures of from about 2 to 20 cc. and, in the case of compositions free from clay, up to about 30 cc., and having a Viscograph curve with a knee at a viscosity of from about 0.2 to 3 poises which lies between about 70° and 85° and, in the case of compositions free from clay, between about 60° and 75° C. and having the characteristic property of increasing in viscosity at a rate substantially higher than that of a similar adhesive free from said alkali metal borate when heated to temperatures within the range of from about 55° to 90° C.; the process which comprises applying to the face of a ply to be laminated the adhesive defined above, immediately combining the adhesive-coated face with another ply under pressure and heating the adhesive substantially simultaneously with its application to temperatures within the range of from about 55° to 90° C., whereby a flash bond is produced capable of withstanding cutting, scoring and other mechanical operations and stronger than that produced by a similar adhesive free from said borate.

9. The process of claim 8 wherein the adhesive used contains a kaolinitic clay as the finely-divided solid siliceous material.

10. The process of claim 8 wherein the adhesive is heated just prior to its application to temperatures within the range of from about 40° to 80° C.

11. The process of claim 8 wherein at least one of the plies to be combined is preheated to temperatures within the range of from about 80° to 105° C.

12. The process of claim 8 wherein the adhesive is preheated to temperatures within the range of from about 40° to 80° C. and at least one of the plies is preheated to temperatures within the range of from about 80° to 105° C.

13. The process of claim 8 wherein the adhesive is preheated to temperatures within the range of from about 40° to 80° C. and the aqueous phase of said adhesive has a viscosity of from about 1 to 8 poises and a gravity of from about 32° to 50° Bé. at 20° C.

14. The process of claim 8 wherein the adhesive is applied at substantially room temperatures and the aqueous phase of said adhesive has a viscosity of from about 0.25 to 1.5 poises and a gravity within the range of from about 30° to 48° Bé. at 20° C.

15. The process of claim 8 wherein the laminated product is a solid fiber board and the over-all viscosity of the adhesive at operating temperatures is within the range of from about 5 to 15 poises.

16. The process of claim 8 wherein one of the plies is corrugated and the adhesive used has an over-all viscosity within the range of from about 0.5 to 5 poises at operating temperatures.

17. In the manufacture of laminated paper board on high-speed laminating machines, the process which comprises applying to the face of a ply to be laminated the adhesive defined in claim 7, immediately combining the adhesive-coated face with another ply under pressure and heating the adhesive substantially simultaneously with its application to temperatures within the range of from about 55° to 90° C., whereby a flash bond is produced capable of withstanding cutting, scoring and other mechanical operations and stronger than that produced by a similar adhesive free from alkali metal borate.

References Cited in the file of this patent

UNITED STATES PATENTS

| | | |
|---|---|---|
| 1,147,996 | Wrede | July 27, 1915 |
| 2,239,478 | Amberson | Apr. 22, 1941 |
| 2,529,851 | Scrutchfield | Nov. 14, 1950 |
| 2,610,136 | Casey et al. | Sept. 9, 1952 |
| 2,669,282 | Kreyling | Feb. 16, 1954 |